(12) United States Patent
Wimmer et al.

(10) Patent No.: US 11,124,112 B2
(45) Date of Patent: Sep. 21, 2021

(54) LIGHTING DEVICE FOR AN INTERIOR TRIM PART

(71) Applicant: Lisa Draexlmaier GmbH, Vilsbiburg (DE)

(72) Inventors: Markus Wimmer, Mamming (DE); Alexandr Zaviyalov, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 108 days.

(21) Appl. No.: 16/542,887

(22) Filed: Aug. 16, 2019

(65) Prior Publication Data

US 2019/0366919 A1 Dec. 5, 2019

Related U.S. Application Data

(63) Continuation of application No. PCT/EP2018/053250, filed on Feb. 9, 2018.

(51) Int. Cl.
| | |
|---|---|
| *B60Q 3/00* | (2017.01) |
| *B60Q 3/64* | (2017.01) |
| *B60Q 3/54* | (2017.01) |
| *B60Q 3/78* | (2017.01) |

(52) U.S. Cl.
CPC ............... *B60Q 3/64* (2017.02); *B60Q 3/54* (2017.02); *B60Q 3/78* (2017.02)

(58) Field of Classification Search
CPC ... B60Q 3/51; B60Q 3/54; B60Q 3/66; B60Q 3/78
See application file for complete search history.

(56) References Cited

U.S. PATENT DOCUMENTS

| | | |
|---|---|---|
| 2006/0012990 A1 | 1/2006 | Walser et al. |
| 2009/0134661 A1* | 5/2009 | Sugiura ................. B60Q 3/217 296/146.9 |
| 2010/0302804 A1 | 12/2010 | Inagaki et al. |

(Continued)

FOREIGN PATENT DOCUMENTS

| | | |
|---|---|---|
| DE | 102012107833 | 2/2014 |
| DE | 102012107834 | 2/2014 |

(Continued)

OTHER PUBLICATIONS

International Search Report for International Application PCT/EP2018/053250, dated Apr. 30, 2018.

*Primary Examiner* — Andrew J Coughlin
(74) *Attorney, Agent, or Firm* — Burris Law, PLLC

(57) ABSTRACT

An illumination device for an interior fitting part of a motor vehicle includes a light guide bar that has a light entry surface along a longitudinal extension direction and a light source bar disposed on the light guide bar. The light source bar includes a plurality of point light sources that are disposed in series along the light entry surface, and a cover element that extends along the longitudinal extension direction of the light guide bar and shields at least one side surface of the light guide bar that differs from the light entry surface. The cover element is connected to the light guide bar via a first attachment element, the light source bar is connected to the light guide bar via a second attachment element, and the light source bar is at least partially housed between cover element and light guide bar.

15 Claims, 5 Drawing Sheets

(56) References Cited

U.S. PATENT DOCUMENTS

| | | | |
|---|---|---|---|
| 2011/0170304 A1* | 7/2011 | Fujita | G02B 6/0008 |
| | | | 362/501 |
| 2011/0170307 A1 | 7/2011 | Ishikawa et al. | |
| 2012/0113660 A1 | 5/2012 | Ishikawa et al. | |
| 2014/0355287 A1* | 12/2014 | Sohizad | B60Q 3/78 |
| | | | 362/545 |
| 2017/0023723 A1* | 1/2017 | Tanaka | B60Q 1/2661 |
| 2018/0022270 A1* | 1/2018 | Matsuoka | F21V 15/01 |
| | | | 362/460 |

FOREIGN PATENT DOCUMENTS

| | | |
|---|---|---|
| DE | 102013200441 | 5/2014 |
| DE | 102013213523 | 1/2015 |
| EP | 2557400 | 2/2013 |
| FR | 3054641 | 2/2018 |

* cited by examiner

LIGHTING DEVICE FOR AN INTERIOR TRIM PART

CROSS-REFERENCE TO RELATED APPLICATIONS

This application is a continuation of International Application No. PCT/EP2018/053250, filed on Feb. 9, 2018, which claims priority to and the benefit of DE 20 2017 100 874.6, filed on Feb. 17, 2017. The disclosures of the above applications are incorporated herein by reference.

FIELD

The present disclosure relates to an illumination device for an interior fitting part of a motor vehicle, in particular of an automobile.

BACKGROUND

The statements in this section merely provide background information related to the present disclosure and may not constitute prior art.

The integration of illumination surfaces in interior fitting parts of motor vehicles is being increasingly used. In particular line lights, i.e., the forming of a homogeneous light line that extends over one or more interior fitting parts, are of particular interest.

Thus, for example, in DE 10 2013 200 441 B3 a motor vehicle illumination device including a light guide is disclosed, wherein light can be supplied via a light source. The light guide includes a light escape surface that extends along a main extension direction of the light guide. Furthermore, the light guide includes a redirecting surface from which incident light is reflected toward the escape surface by total reflection.

In DE 10 2013 213 523 A1 a diffusing disc including a receiving section for a linear light guide, a radiation section extending parallel to the receiving section for radiating light from a diffusing disc, and a connecting section that connects the receiving section to the radiation section are disclosed. The diffusing disc consists of a transparent material, so that light emitted by the linear light guide can be received by the receiving section and guided toward the beam section. In the radiation section the light can escape the diffusing disc and radiate into the interior of the vehicle.

However, the solutions known in the prior art for generating a homogeneous linear illumination in an interior fitting part have the disadvantage that they have either a very complex design and need a relatively large installation space, as it were, or the installation complexity of the illumination is very high.

SUMMARY

The present disclosure provides an illumination device for an interior fitting part of a motor vehicle that reduces installation space and is simultaneously easy to install.

An illumination device for an interior fitting part of a motor vehicle comprises a light guide bar, a light source bar, and a cover element. In one form, the light guide bar is formed from an at least partially transparent material and includes a light entry surface extending along a longitudinal extension direction. In this context a longitudinal extension direction can be understood to mean a direction that extends parallel to the longest side of the light guide bar. Furthermore, a light entry surface can be understood to mean a surface or top surface of the light guide bar, via which light is couplable into the light guide bar, wherein the light entry surface in one form is formed by at least one of the longest surfaces of the light guide bar. The light guide bar can include one or more of such light entry surfaces. The light guide bar in one form is formed from a transparent plastic, such as, for example, polycarbonate or polymethyl methacrylate.

The light source bar comprises a plurality of point light sources that are disposed in series, in particular along a parallel to the longitudinal extension direction. In one form, the distances at which the point light sources are disposed with respect to each other are constant. The light source bar is disposed on the light guide bar such that the point light sources disposed in series are disposed along the light entry surface. Here, the light sources are oriented with respect to the light entry surface such that light emitted by the light sources radiates directly toward the light entry surface and thus the light of the point light sources is couplable into the light guide bar. The light source bar can include, for example, of a semiconductor plate on which the light sources are applied. The light sources can be formed, for example, by light-emitting diodes and in particular by multicolor light-emitting diodes (RGB-LED). It is also possible that the light source bar is constructed of a plurality of semiconductor plates that are connected to one another, for example, via at least one contact band.

The cover element also extends along the longitudinal extension direction of the light guide bar. At least one lateral surface of the light guide bar that differs from the light entry surface is shielded here by the cover element. In this context the shielding can be effected both in a light-absorbing and light-reflecting manner. In this case "shielding" can be understood to mean that a light emitted by the light guide bar or light source bar is absorbed and/or reflected by the light guide bar, as well as that the ambient light that radiates toward the illumination device, at least on the sides that are shielded by the cover element, is absorbed or reflected by the cover element. The cover element therefore is formed from of an opaque, light-absorbing, or light-reflective material.

The cover element is connected to the light guide bar via a first attachment element, and the light source bar via a second attachment element. In other words, both the light source bar and the cover element are attached to the light guide bar. Furthermore, the light source bar is housed at least partially between the cover element and the light guide bar. In this context "housed" can be understood to mean that the light source bar is completely enclosed by the light guide bar and the cover element. In this way it is provided on the one hand that light emitted by the light source bar is either radiated into the light guide bar or absorbed by the cover element, which simplifies the generating of a defined light image, and on the other hand the light source bar is simultaneously protected from external environmental influences, in particular electrical or electrostatic influences. This is particularly relevant if the light source bar is formed from a semiconductor plate.

In order to manufacture an illumination device, in a first step the light source bar is attached to the light guide bar via the second attachment element. The attachment is effected such that the light source bar is already correctly aligned with respect to the light guide bar. The cover element is subsequently attached to the light guide bar via the first attachment element in one form of the present disclosure. Here the light source bar is mounted between light guide bar and cover element. A closed system thus arises. The light source bar and in particular the point light sources disposed thereon and their electronics are protected from environmental influences.

Since the light guide bar is connected to the cover element and the light source bar via the first and second attachment element, a subassembly is generated that can be dimensioned not only in a space-saving manner, but simultaneously is easily installable. It is possible, for example, to preassemble light guide bar, light source bar, and cover element to form a subassembly and then to integrate the finished illumination device in the vehicle interior or in the interior fitting part of the vehicle. The installation in vehicle manufacturing is thus simplified. A further advantage of the illumination device is that the light source bar can be positioned on the light guide bar in a particularly simple and reproducible manner. This advantage is particularly of high relevance if the light decoupled from the light guide bar is to be perceptible as homogeneous light and the individual point light sources are to be no longer to be recognizable as such. Due to an attachment of the light source bar directly onto the light guide, this positioning is simplified.

It has been found that a light generated by the light source bar and coupled into the light guide bar via the light entry surface must lie back a certain distance inside the light guide bar in order to be able to mix sufficiently in the desired manner to generate a homogeneous light image on a light escape surface. In order to further design the installation space of the light guide bar as compact, it is therefore advantageous if the light guide bar bends from the light entry surface to the light escape surface. The angle of curvature here can be between 0 and 90°. Here, the curvature has an arc shape.

In order to generate an illumination that has a strong illumination on at least one surface section and decreases in illumination-strength and -intensity with increasing distance from this surface section (so-called fade-out effect) it is advantageous if an angled surface piece that comprises the light escape surface connects to the curvature. The surface piece in one form is angled at an angle of 70-120° with respect to the curvature. Furthermore, the surface piece forms a square in one variation of the present disclosure, in particular a rectangular light escape surface. The surface piece can be attached to the light guide bar both as a one-piece component and as an additional component on the light guide bar. However, it has been shown that a particularly high-quality fade-out effect can be achieved if the surface piece is disposed on the light guide bar as a separate component. Furthermore, an air gap can be present between the surface piece and light guide bar.

It is furthermore advantageous if the light guide bar comprises a light-guiding section and a light-scatter section. In this context a light-guiding section can be understood to mean a section wherein the light is guided or directed, but not scattered or only scattered to the smallest-possible degree. The light-guiding section therefore is formed from a highly transparent material. However, the light scattering section can be understood as a section wherein light is scattered particularly strongly. The light scattering section therefore is formed from a material that has light-scattering properties, which can be realized, for example, by a transparent plastic including scattering particles. The light-guiding section in one form is disposed in the region of the light entry surface, wherein the light-scattering section is disposed in the region of a light-escape surface. In this way after coupling-in on the light entry side the light first irradiates the light-guiding section, then reaches the light-scatter section directly adjacent to the light-guiding section, wherein the light is scattered strongly. The light can subsequently be decoupled on a light escape surface that is formed in the light scattering section. A light guide bar including light scattering section and light-guiding section can be manufactured, for example, in a two-component injection molding.

Furthermore, it has proven advantageous if the light guide bar tapers at least sectionally from the light entry surface to a light escape surface. Due to the tapering a relatively wide light entry surface can be chosen so that sufficient light can be coupled into the light guide bar from the light sources. However, the light escape surface can be chosen significantly narrower than the light entry surface, which brings installation space advantages. Here the light guide can taper either stepwise or uniformly from the light entry side to the light escape side. It is particularly preferred here that the light guide tapers uniformly and steadily from the light entry side to the light escape side.

Furthermore, the light guide bar can include positioning elements that make possible a correct positioning of the light source bar on the light guide bar. Due to the positioning elements it is thus provided during the installation of the light source bar on the light guide bar that in particular the point light sources are disposed on the light entry surface at defined positions. The positioning elements can be disposed, for example, at regular intervals along the longitudinal extension direction of the light guide bar. It can also be advantageous if the positioning elements are not disposed directly on the light entry surface, in order to prevent inhomogeneity in the light distribution inside the light guide bar. Furthermore, the positioning elements can be embodied as one-piece or of uniform material with the light guide bar.

It is of particular advantage if the positioning elements are formed as projections or as bridges that engage in recesses that are introduced in the light source bar in order to prevent a movement of the light source bar, in particular in the longitudinal extension direction, along the light guide bar. In this way, using the positioning elements the light source bar is not only aligned with respect to the light guide bar, but it also remains provided that the light source bar maintains its positioning even in the installed state. The projections can be embodied with uniform material with the light guide bar or also be subsequently attached to the light guide bar.

It is advantageous if at least one spacer element spaces the light source bar and in particular the point light sources from the light entry surface. The at least one spacer element can be either part of the light guide bar or also part of the light source bar. However, it is also possible that the spacer is attached as an additional component between light guide bar and light source bar. Due to the spacer element it is provided that the light sources are disposed specifically on the light entry side, but do not come into contact therewith and have a defined distance thereto. This has the advantage on the one hand that the light sources are neither damaged during installation nor during normal operation. Simultaneously it is provided by a defined distance that is generated by the spacer element that a defined light coupling occurs.

It is advantageous if the second attachment element comprises at least one insertion element, so that the light source bar is attachable to the light guide bar via an inserting into the insertion element. The insertion element can be embodied as one-piece, i.e., with uniform material with the light guide bar. The insertion element can be formed, for example, as a channel or bridge that generates a gap, so that the light source bar is insertable into the gap or the channel. However, the insertion element in one form is formed from a plurality of bridges that are disposed spaced from one another. Furthermore, the insertion element is positioned on the light source bar such that it neither obstructs nor causes wear on the light source bar in its functionality. If the light source bar is, for example, a semiconductor plate, the insertion element is positioned between the light sources at positions at which no semiconductor paths can be worn or damaged by the insertion element. The insertion element therefore abuts on the light guide bar only in a point-shaped manner.

It is advantageous if the insertion direction of the insertion element extends at least sectionally parallel to the light entry surface. In this context "insertion direction" can be understood to mean the direction in which the light source bar can be pushed into the insertion element in order to be attached in the insertion element. The end position of the insertion of the light source bar can be provided, for example, by a stop.

Furthermore, it is advantageous if the cover element connects to the insertion element such that the light source bar is retained in the insertion element by the cover element. In this way the light source bar can be introduced first into the insertion element and by subsequent applying of the cover element onto the light guide bar it remains provided that the light source bar can no longer loosen from the insertion element. It is advantageous if the light source bar abuts both on the light guide bar and on the cover element, so that the light source bar can no longer move inside the insertion element.

Alternatively, or additionally the second attachment element can comprise at least one positioning mandrel that is guided through a bore provided on the light source bar and, for example, secured by being welded or hot-stamped. The positioning mandrel in one form is embodied with a uniform material with the light guide bar. It is particularly advantageous if a plurality of positioning mandrels are disposed along the longitudinal extension direction of the light guide bar. Due to the use of positioning mandrels an attaching of the light source bar can be effected that makes possible not only a point-precise positioning, but is also difficult to release. This thus simultaneously increases the resistance of the subassembly.

The first attachment element can include an interference-fit connecting element, in particular a locking hook, a clip, or a spring groove connection, which engages into a provided fitting. Here the connecting element can be disposed either on the light guide bar or on the cover element. The fitting is disposed on the respective other component. If the connecting element is disposed on the light guide bar, the fitting is disposed on the cover element.

A third attachment element for attaching to an interior fitting part can additionally be provided both on the light guide bar and on the cover element. The third attachment element can be embodied as one-piece with the cover element or the light guide bar and serves primarily for attaching the illumination device to the interior fitting part. Here a plurality of third attachment elements that differ from one another in attachment technology can also be used. Thus, for example, a plurality of screw mandrels can be provided on the light guide bar and a plurality of clips on the light guide bar in order to first pre-fix the illumination device via clips on the interior fitting part and subsequently to securely screw, with the aid of the screw mandrel, the illumination device on the interior fitting part. However, the third attachment element can also comprise, for example, welding tabs or welding mandrels.

Depending on the application case the light escape surface can abut directly on the interior of the vehicle, so that the light guide bar is visible for the vehicle occupant. However, it is also possible that a transparent decorative element is disposed between vehicle interior and light guide bar, which decorative element is adjacent to the light escape surface. The decorative element can partially or also completely cover the light escape surface of the light guide bar. The viewer who is located in the interior of the vehicle thus does not directly perceive the illumination device or the light guide bar, but rather only the light emitted by the light guide bar, which light passes through the decorative element. The decorative element can be chosen both completely transparent and translucent.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
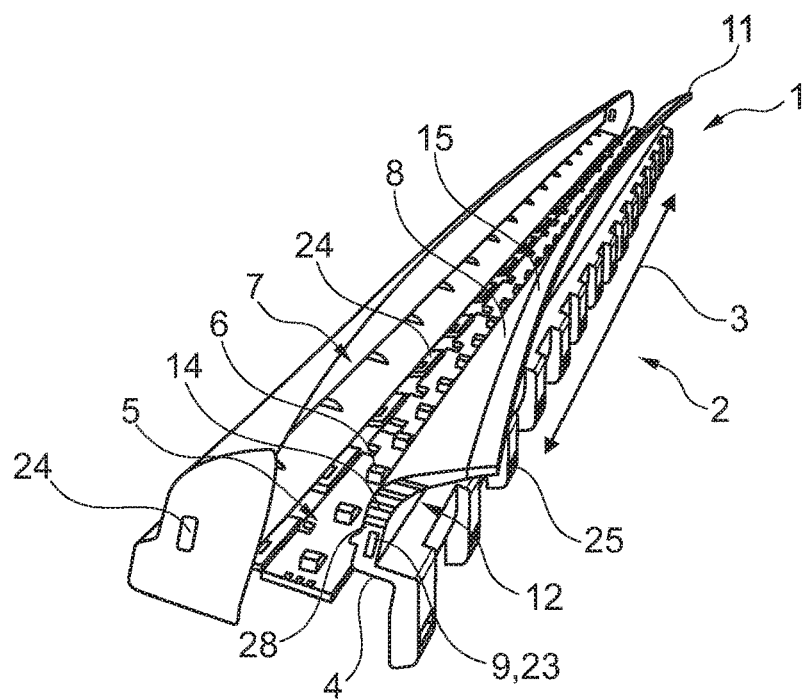
FIG. 1 shows a three-dimensional illustration of an illumination device according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a perspective exploded view of an illumination device 1 according to one form of the present disclosure, comprising a light guide bar 2, a light source bar 5, and a cover element 7. The light source bar 5 includes a plurality of semiconductor plates connected to one another, on which point light sources 6 in the form of light-emitting diodes are applied at regular intervals. The point light sources 6 are disposed on a light entry surface 4 of the light guide bar 2.

In the present form the light guide bar 2 is formed from a transparent polycarbonate. The light guide bar 2 is also manufactured in a two-component injection molding process and includes a highly transparent light-guiding section 14 and a diffuse guide scattering section 15, wherein the light entry surface 4 is disposed in the light guide section 14 and the light escape surface 11 is disposed in the light-scattering section 15.

The light guide bar 2 has a curvature 12 emanating from the light entry surface 4 to the light escape surface 11 or in the transition section there between. In the three-dimensional illustration it is also clear that the curvature 12 changes over the longitudinal extension direction of the light guide bar 3 so that the light guide bar 2 has not only a curved, but also a slightly bent, arched, or twisted course between light entry surface 4 and light escape surface 11. In addition, the light guide bar 2 tapers steadily from the light entry surface 4 to the light escape surface 11. In the present form first attachment elements 9 in the form of locking lugs are disposed on the end sides 28 of the light guide bar 2. The first attachment elements 9 serve for attaching a cover element 7.

The cover element 7 is attached to the light guide bar 2 after the light source bar 5 is positioned on the light guide bar 2. This leads to the light source bar 5 being completely housed between light guide bar 2 and cover element 7. Simultaneously the cover element 7 shields a side surface 8 in a light-absorbing manner, via which side surface 8 no light-emitting and -in-coupling is desired. The cover element 7 is attached to the light guide bar 2 by the first attachment elements 9 engaging into a fitting 24 provided for this purpose in the cover element 7. In the present form the cover element 7 is formed from an opaque polypropylene.

For attaching to a not-depicted interior fitting part 26 (FIG. 3), the light source bar 2 includes additional third attachment elements 25 that are disposed in series along the longitudinal extension toward the light guide bar 2. In the present form the third attachment elements 25 are formed with a uniform material with the light guide bar 2 and are depicted by receptacles for locking hooks, so that the entire illumination device 1 is attachable via the light guide bar 2 to locking hooks on the interior fitting part 26 provided for this purpose.

Figure 2:
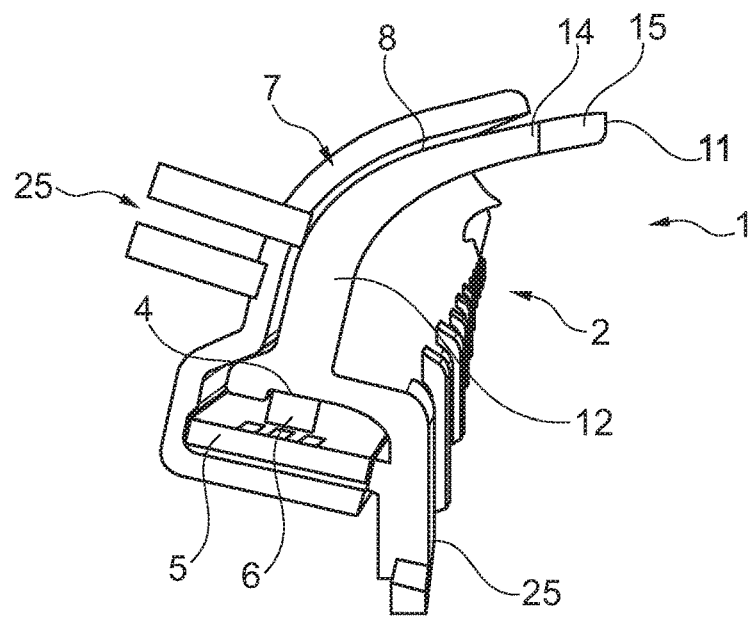
FIG. 2 shows an illumination device according to the form in FIG. 1 in a sectional view.

In FIG. 2, which represents a sectional illustration of the form according to FIG. 1, a third attachment element 25 in the form of a screw dome is additionally provided on the cover element 7. After the illumination device 1 is thus retained on the locking hook, the illumination device 1 can be fixed via the screw mandrel on the interior fitting part 26.

Figure 3:
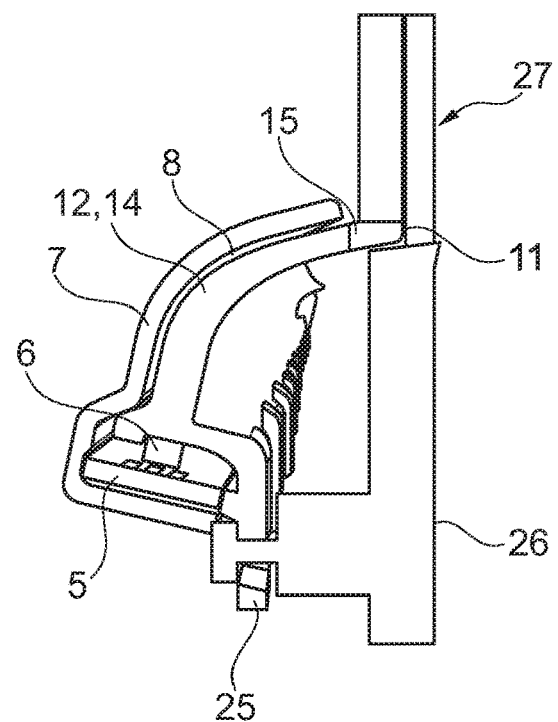
FIG. 3 shows a sectional view of an illumination device according to another form of the present disclosure.

Another form of the illumination device 1 is shown in FIG. 3 in a sectional illustration. In such a form the illumination device 1 is already attached to an interior fitting part 26 via third attachment elements 25. Here the light escape surface 11 adjoins a decorative element 27 that is formed from a transparent material, which is provided in the present form by colored polycarbonate. The viewer who is located in the vehicle interior thus does not directly perceive the illumination device 1, but rather only the light shining through the decorative element 27. Furthermore, the decorative element 27 is disposed angled with respect to the light escape surface 11, wherein the light escape surface 11 is disposed at the lower edge of the decorative element 27. Due to the cover element 7, which extends along the side surface 8 of the light guide bar 2, it is also provided that no undesired light-in- and out-coupling results from the rear side of the light guide bar 2.

Figure 4:
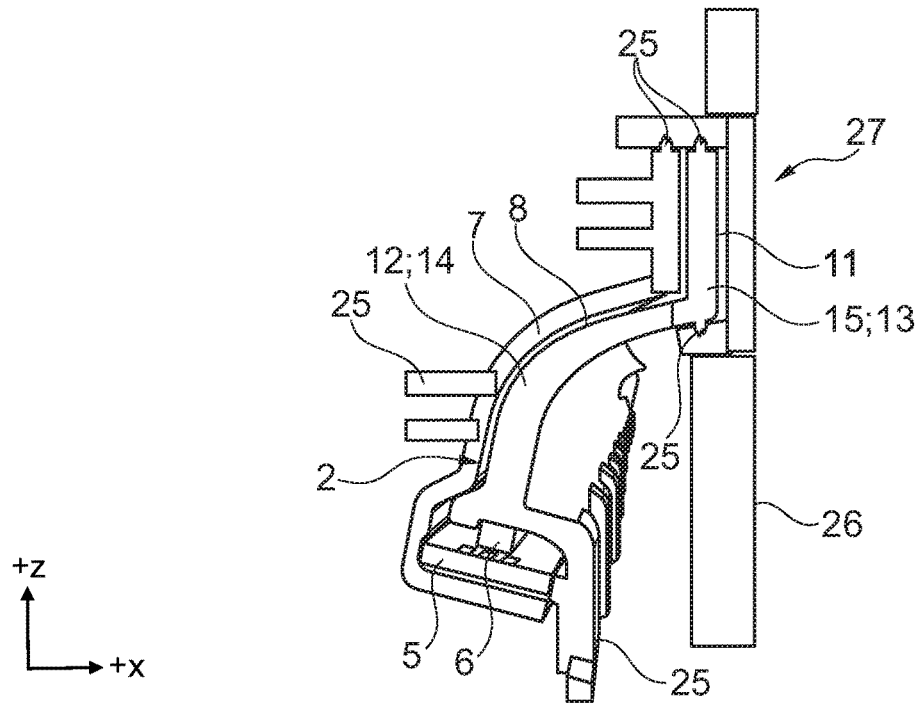
FIG. 4 shows a sectional view of an illumination device according to yet another form of the present disclosure.

FIG. 4 shows yet another form of the illumination device 1, also in a sectional illustration. The illumination device 1 is attached to the interior fitting part 26 via a plurality of third attachment elements 25. On the one hand locking lugs are formed both on the light guide bar 2 and on the cover element 7, which locking lugs engage into the interior fitting part 26. On the other hand, the cover element 7 simultaneously includes screw mandrels on which the illumination device 1 can be screwed. In order to provide a defined light image, an angled surface piece 13 is also disposed on the curvature 12 of the light guide bar 2. The surface piece 13 extends approximately parallel to the decorative element 27 disposed in front of the surface piece 13 and forms the light escape surface 11. In the present form the surface piece 13 is disposed at an angle of approximately 105° with respect to the curvature 12. Here the angle is to be understood to be the angle that spans between the rear wall (−x direction) of the surface piece 13 and the curvature 12. Due to the angled surface piece 13 the decorative element 27 is unevenly shone-through by the light guide bar 2. At the lower edge in the region of the curvature 12 significantly more light radiates through the decorative element 27 than in the region of the surface piece 13. This light distribution leads to a fade-out effect.

Figure 5:
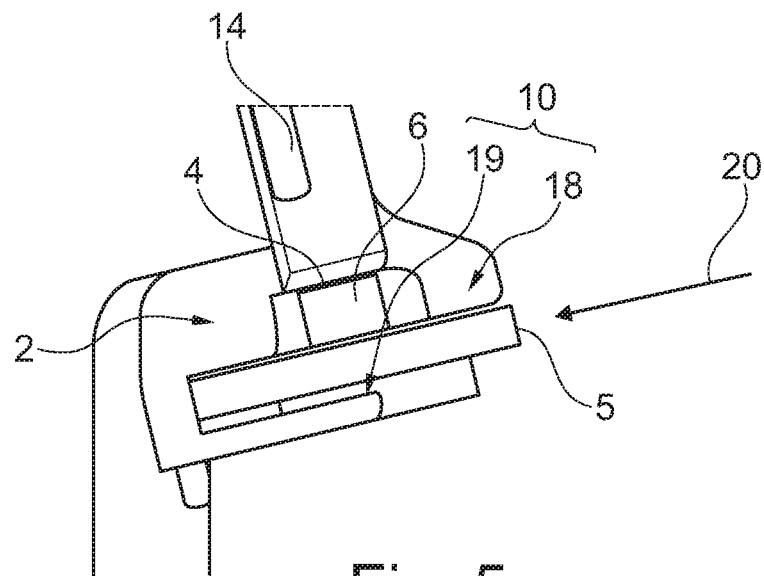
FIG. 5 shows an enlarged illustration of a light guide bar in the region of a light entry surface according to the teachings of the present disclosure.

FIG. 5 shows an enlarged illustration of the light guide bar 2 (FIG. 2) in the region of the light entry surface 4. The light guide bar 2 forms an insertion element 19 into which the light source bar 5 is insertable and the light source bar 5 is connected to the light guide bar 2 via a second attachment element 10. In addition, spacer elements 18 are formed by the geometry of the light guide bar 2, which spacer elements 18 hold the light sources 6 at a small distance from the light entry surface 4 and thus no direct contact occurs between light source 6 and light entry surface 4. In at least one form, the second attachment element 10 includes the spacer elements 18 and the insertion element 19. The light-guiding section 14 extends perpendicularly away from the light entry surface 4, so that the coupled-in light can be guided in the light-guiding layer with as few reflections as possible. Furthermore, the light source bar 5 abuts directly on the light guide bar 2, so that a positioning in a first spatial direction can already be effected using the insertion element 19 and the stop.

Figure 6:
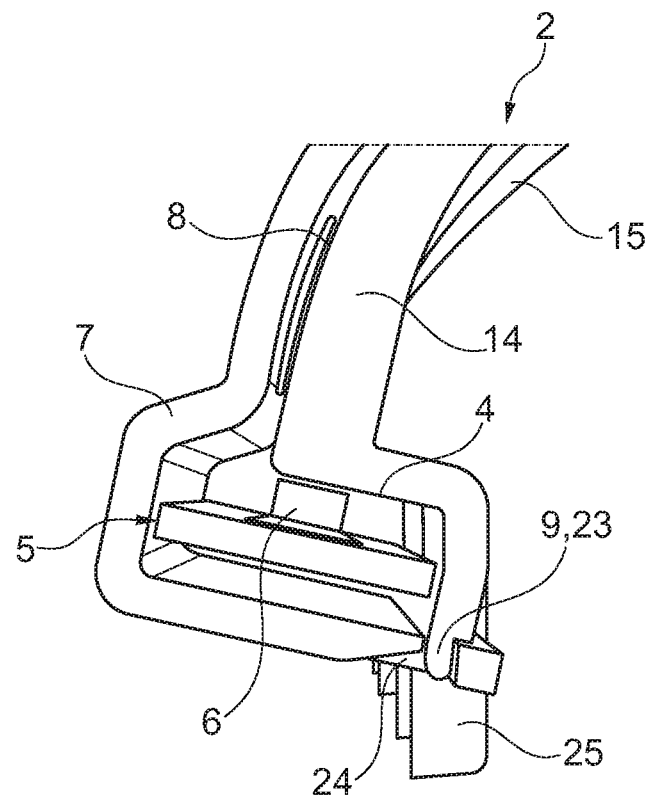
FIG. 6 shows a further enlarged illustration of the illumination device in the region of a light entry surface according to the teachings of the present disclosure.

FIG. 6 shows yet another form of an illumination device 1 in the region of the light entry surface 4. In contrast to the form according to FIG. 5, the cover element 7 is additionally depicted. The cover element 7 is attached along the longitudinal extension direction 3 of the light guide via a plurality of first attachment elements 9 that are formed in the shape of locking hooks on the light guide bar 2 and in the shape of fittings 24 on the cover element 7. Furthermore, the light source bar 5 is disposed between cover element 7 and light guide bar 2 such that a movement of the light source bar 5 parallel to the light entry surface 4 is reduced (e.g., not possible).

Figure 7:
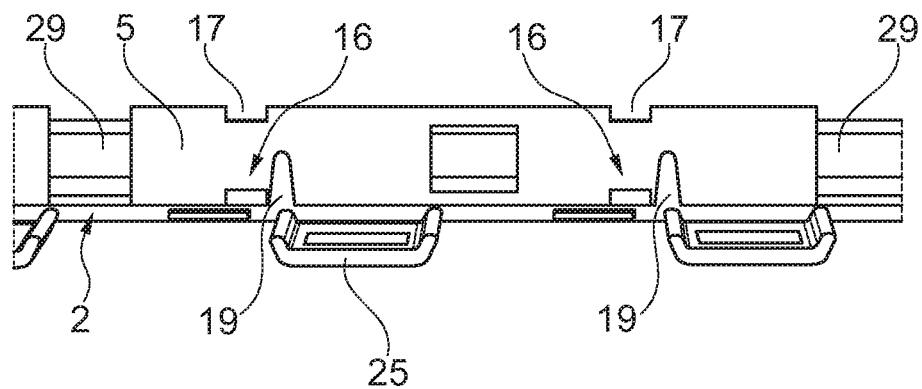
FIG. 7 shows one view of a light guide bar and light source bar according to one form of the present disclosure.
Figure 8:
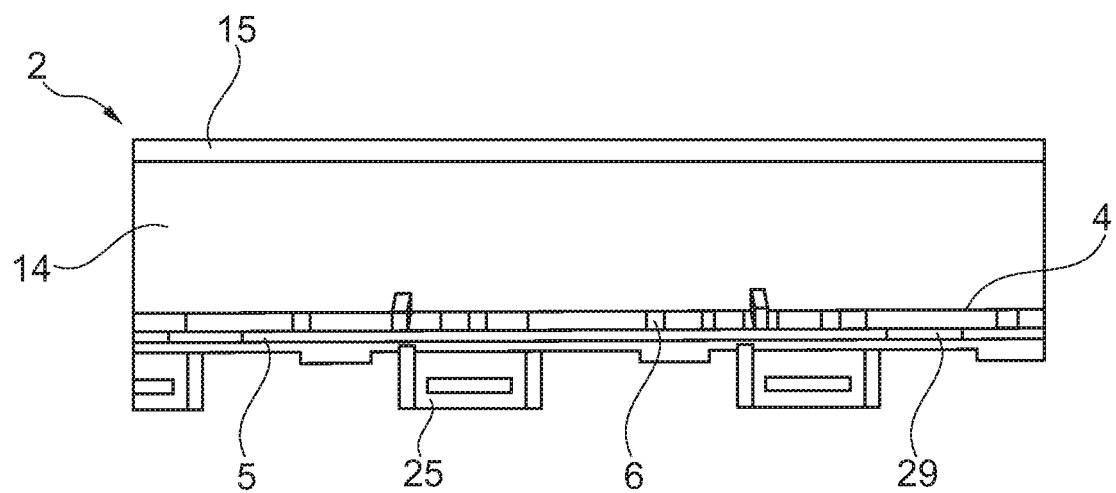
FIG. 8 shows another view of the light guide bar and light source bar of FIG. 7.

FIG. 7 shows a light guide bar 2 including light source bar 5 disposed thereon according to one form of the present disclosure. The light source bar 5 is retained on the light guide bar 2 via insertion elements 19 that are formed with a uniform material with the light guide bar 2. In addition, the light guide bar 2 includes positioning elements 16 formed with a uniform material therewith that engage into recesses 17 of the light source bar 5. In this way the light source bar 5 is positioned with respect to the light guide bar 2. Furthermore, in this way a movement of the light source bar 5 in the longitudinal extension direction 3 (FIG. 1) of the light guide bar 2 is reduced (e.g., prevented). In the form shown the light guide bar 2 includes semiconductor plates that are connected to one another via contact bands 29. The form according to FIG. 7 is depicted in a front view in FIG. 8.

Figure 9:
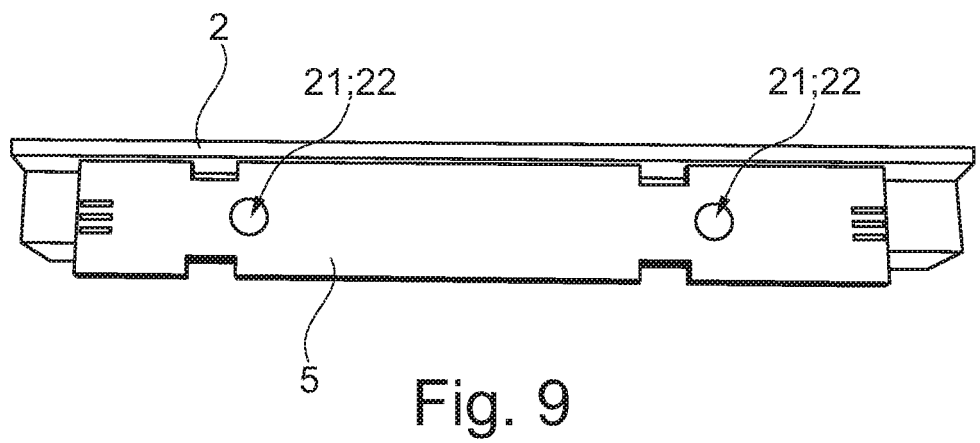
FIG. 9 shows one view of a light source bar and light guide bar according to another form of the present disclosure.
Figure 10:
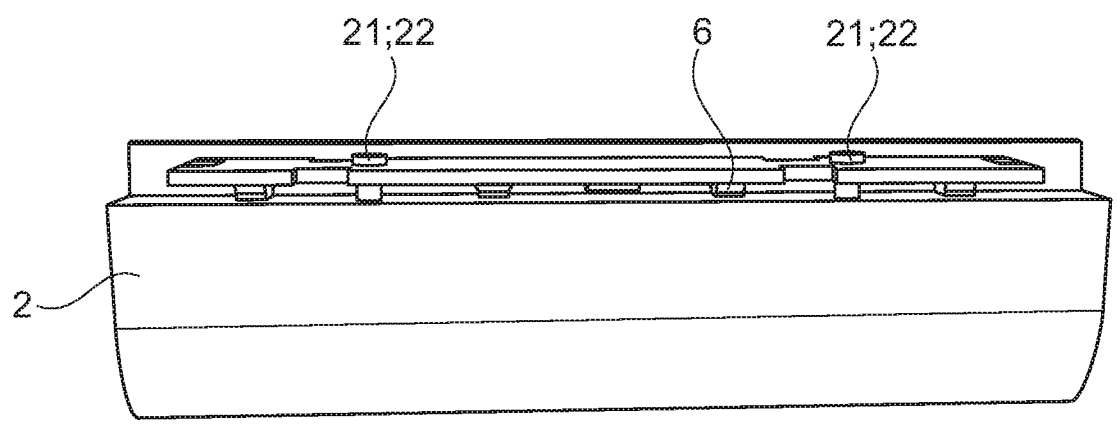
FIG. 10 shows another view of the light source bar and light guide bar of FIG. 9.

FIG. 9 shows an alternative form of a light guide bar 2 and a light source bar 5. Here the light source bar 5 is depicted by a single plate that is attached to the light guide bar 2 via two positioning mandrels 21. The positioning mandrels 21 are embodied with a uniform material with the light guide bar 2. FIG. 10 shows an alternative view of this form. In this form positioning- or spacer-elements 16 can be omitted. The positioning mandrels 21 namely have a step-like design, so that the light source bar 5 abuts on one of the steps of the positioning mandrels 21. Here the steps are chosen such that a defined distance is produced between light sources and light entry surface 4. Furthermore, the bore 22 inside the light source bar 5 is chosen such that any movement parallel to or perpendicular to the longitudinal extension direction 3 of the light guide bar 2 is inhibited.

The explanations made with respect to the Figures are purely exemplary and at no point indicate a disclaimer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An illumination device for an interior fitting part of a motor vehicle, comprising:
    a light guide bar having a planar light entry surface extending continuously along a longitudinal extension direction of the light guide bar;
    a light source bar disposed on the light guide bar, the light source bar comprising a plurality of point light sources disposed in series along the light entry surface; and
    a cover element extending along the longitudinal extension direction of the light guide bar and shielding at least one side surface of the light guide bar, wherein the at least one side surface is different from the light entry surface, and
    wherein
    the cover element is connected to the light guide bar via a first attachment element, and the light source bar is connected to the light guide bar via a second attachment element, and
    the light source bar is at least partially housed between the cover element and light guide bar.

2. The illumination device according to claim 1, wherein the light guide bar has a curvature at least sectionally from the light entry surface to a light-escape surface such that the light guide bar with the curvature is configured to guide light from the light entry surface to the light-escape surface.

3. The illumination device according to claim 2, wherein an angled surface piece that comprises the light-escape surface connects to the curvature of the light guide bar.

4. The illumination device according to claim 1, wherein the light guide bar comprises a light-guiding section and a light-scattering section.

5. The illumination device according to claim 1, wherein the light guide bar tapers at least sectionally from the light entry surface to a light-escape surface.

6. The illumination device according to claim 1, wherein the light guide bar includes positioning elements that position the light source bar on the light guide bar.

7. The illumination device according to claim 6, wherein the positioning elements are formed as projections that engage into recesses of the light source bar.

8. The illumination device according to claim 1, wherein at least one spacer element spaces the plurality of point light sources from the light entry surface.

9. The illumination device according to claim 1, wherein the second attachment element comprises at least one insertion element such that the light source bar is attachable to the light guide bar via insertion into the at least one insertion element.

10. The illumination device according to claim 9, wherein the insertion direction of the insertion element extends parallel to the light entry surface.

11. The illumination device according to claim 9, wherein the cover element connects to the insertion element such that the light source bar is retained in the insertion element by the cover element.

12. The illumination device according to claim 1, wherein the second attachment element comprises at least one positioning mandrel that is guided and secured through a bore provided on the light source bar.

13. The illumination device according to claim 1, wherein the first attachment element comprises an interference-fit connecting element in the form of a locking hook that engages into a fitting on the cover element.

14. The illumination device according to claim 1, wherein a third attachment element for attaching to an interior fitting part is disposed on at least one of the light guide bar and the cover element.

15. The illumination device according to claim 1, wherein the light guide bar abuts via a light-escape surface on a light-transmitting decorative element.

* * * * *

UNITED STATES PATENT AND TRADEMARK OFFICE
CERTIFICATE OF CORRECTION

PATENT NO. : 11,124,112 B2
APPLICATION NO. : 16/542887
DATED : September 21, 2021
INVENTOR(S) : Markus Wimmer It is certified that error appears in the above-identified patent and that said Letters Patent is hereby corrected as shown below:

On the Title Page

Between (63) and (51), please add:
--(30) Foreign Application Priority Data
Feb. 17, 2017 (DE) ...............20 2017 100 874.6--.

Signed and Sealed this
Tenth Day of January, 2023

Katherine Kelly Vidal
*Director of the United States Patent and Trademark Office*